J. J. NAUGLE.
COMBINATION FILTER PRESS AND DRIER.
APPLICATION FILED OCT. 19, 1916.

1,377,022.

Patented May 3, 1921.
3 SHEETS—SHEET 1.

WITNESSES

INVENTOR
J. J. Naugle
BY
ATTORNEYS

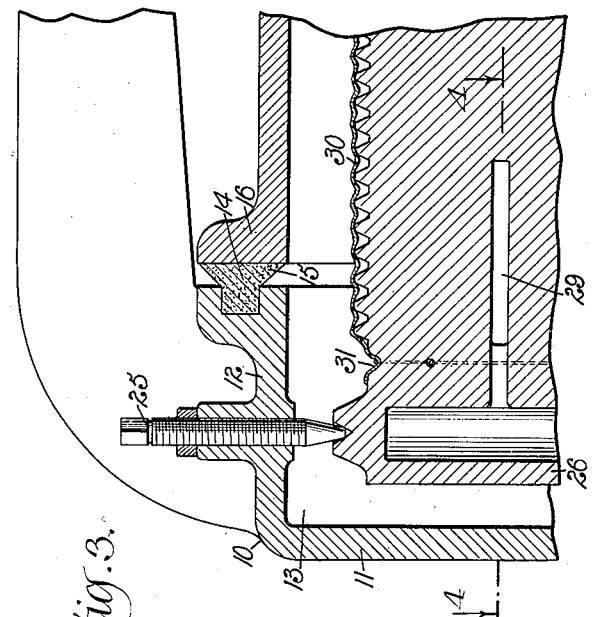
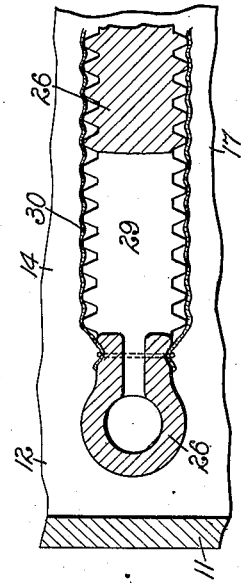
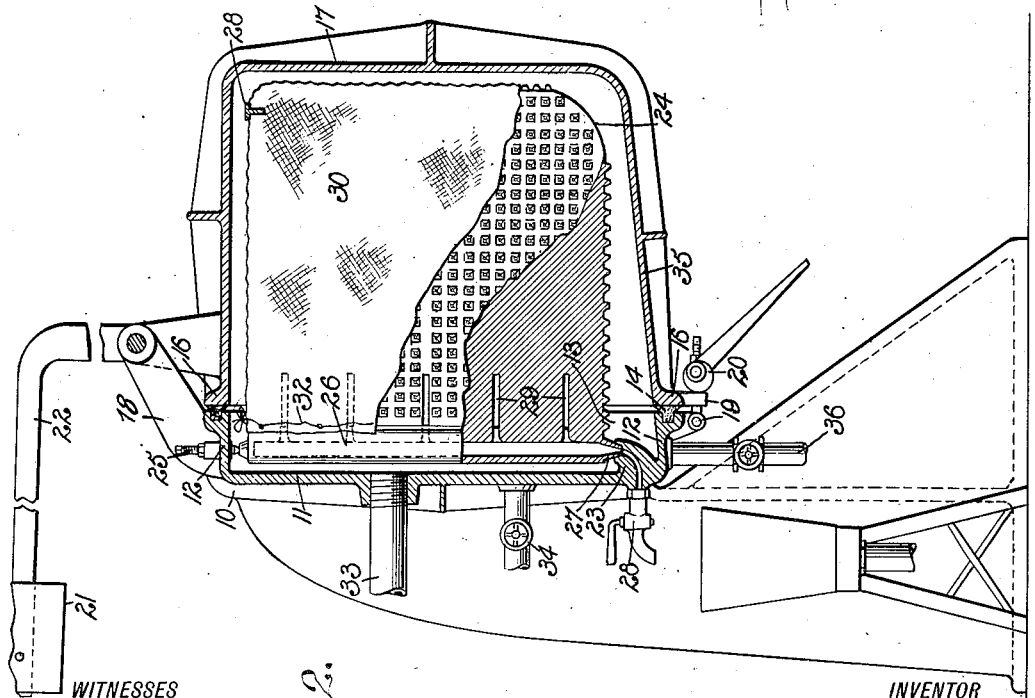

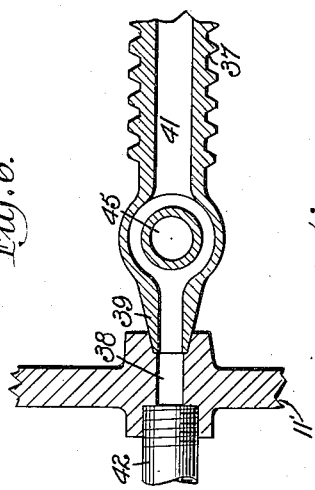
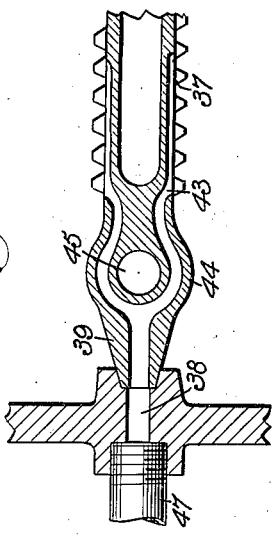
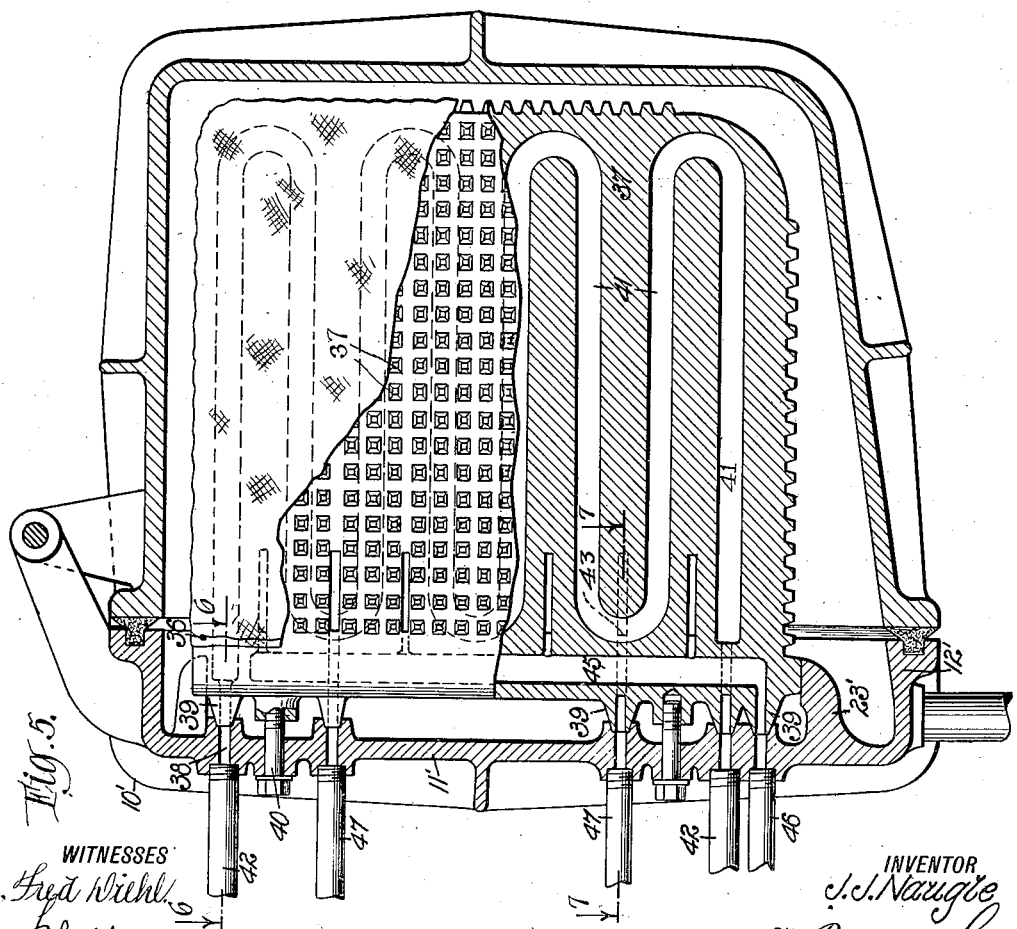

UNITED STATES PATENT OFFICE.

JOHN JAY NAUGLE, OF BROOKLYN, NEW YORK.

COMBINATION FILTER-PRESS AND DRIER.

1,377,022.    Specification of Letters Patent.    Patented May 3, 1921

Application filed October 19, 1916. Serial No. 126,508.

*To all whom it may concern:*

Be it known that I, JOHN JAY NAUGLE, a citizen of the United States, and a resident of the city of New York, borough of Brooklyn, in the county of Kings and State of New York, have invented a new and Improved Combination Filter-Press and Drier, of which the following is a full, clear, and exact description.

My invention relates to filter presses particularly adaptable for filtration under pressure or vacuum.

An object of the invention is to provide a filter press in which the residual filter cake may be discharged without the aid of a fluid, and substantially automatically.

Another object of the invention is to provide a filter press having a sectional housing the stationary part of which presents a supporting wall for the filter plates and from which plates the cake will detach under its own weight as soon as the movable sectional part of the housing is displaced.

A further object of the invention is to provide a filter press having a sectional housing the stationary part of which presents a wall from which the filter plates are supported and through which wall connection may be established with the filter plates for facilitating the filtration through the medium of a vacuum created through said connection, circulating brine through said plates for filtration under low temperature, or passing a heating medium through the plates.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Fig. 2 is a transverse vertical section on line 2—2, Fig. 1;

Fig. 3 is an enlarged, fragmentary, vertical, transverse section of the upper part of the housing and plate in proximity to the stationary section of the housing;

Fig. 4 is a horizontal cross section on line 4—4, Fig. 3;

Fig. 5 is a vertical cross section though a modified filter press embodying my invention;

Fig. 6 is a transverse cross section on line 6—6, Fig. 5; and

Fig. 7 is a transverse cross section on line 7—7, Fig. 5.

Figure 1:
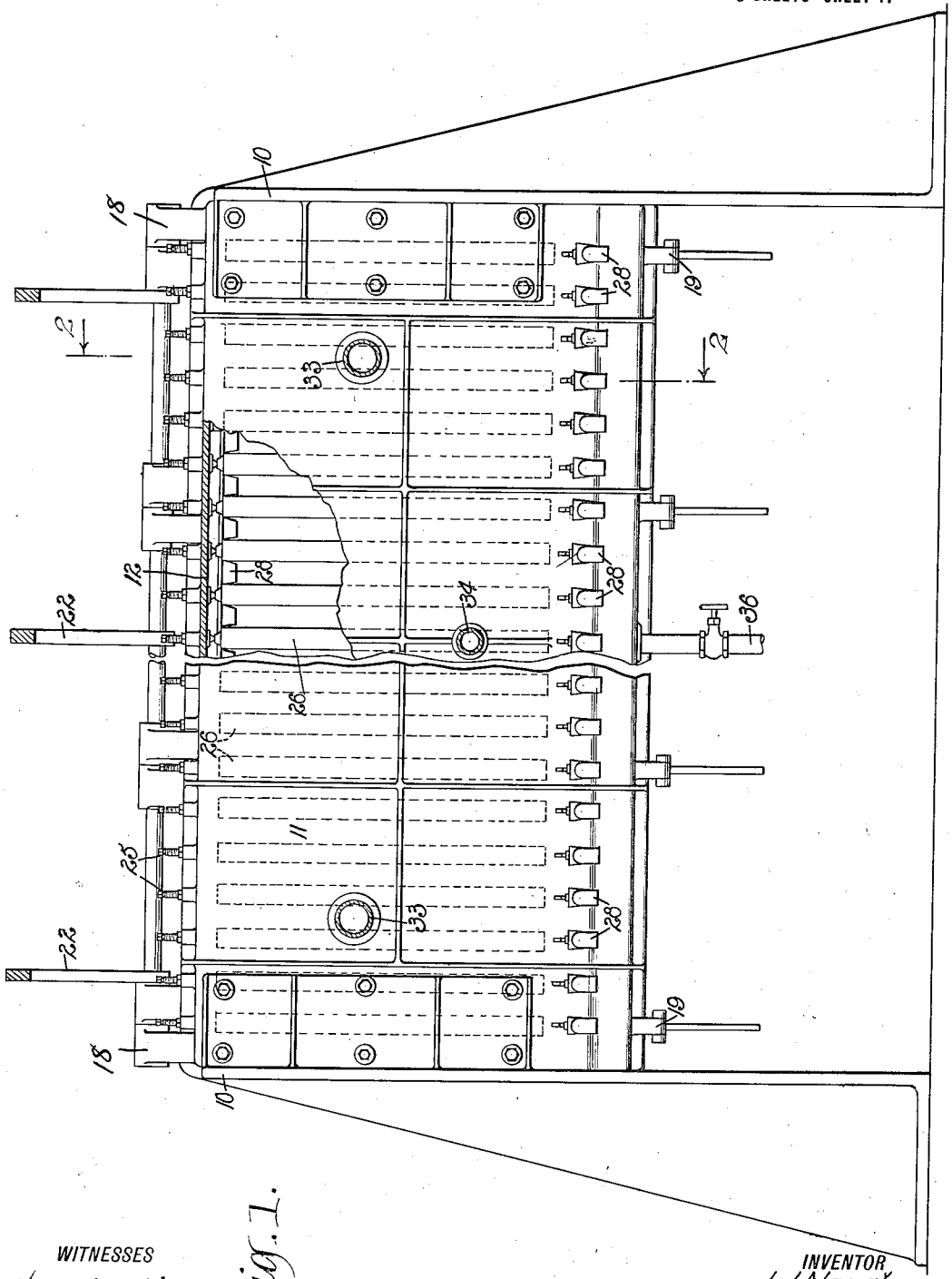
Figure 1 is a rear elevation of a press embodying my invention partly in section, a portion of the wall being broken away to show the details of construction.

Referring to the drawings, 10 is a stationary part of the housing, which presents a substantially vertical elongated wall 11 bordered at the longitudinal or horizontal edges with inwardly-directed portions 12 and at the transverse or vertical edges with inwardly-directed portions 13. The longitudinal and transverse portions carry a yielding gasket 14 on the face thereof. This gasket has a lip 15 depending inwardly.

The movable cross section of the housing complements the stationary housing section 10 and forms therewith a housing of angular cross section. As shown, the cross section thereof is substantially rectangular. Both the stationary and the movable sections of the housing are ribbed at suitable intervals to increase their strength, for the housing must withstand pressure under which filtration takes place therein. The movable section is suspended from an arm 18 provided on the upper longitudinal portion 12. The lower longitudinal portion 12 and the flange 16 thereat of the movable section have suitable lugs 19 to which locking means 20 may be attached for locking the movable housing section to the stationary housing section. The weight of the movable section 17 is preferably balanced by a counterweight 21 extending from an arm 22 in rigid connection with the housing section 17.

The wall 11 of the stationary housing section 10 presents a longitudinal shoulder 23 near the lower longitudinal portion 12. This shoulder constitutes the lower support for filter plates 24. The upper support for the plates is formed by set screws 25 which pass through the upper longitudinal portion 12. These set screws lock the plates to the stationary wall section from which the plates are suspended. It will be noted that the stationary and movable sections of the housing have a clearance about the plates to allow the circulation of the medium to be filtered between the plates. The filter plates 24 have preferably a substantially tubular cylindrical edge 26 next to the wall 11, which terminates at the lower end with a hollow conical projection 27 for which a corresponding recess is formed in the shoulder 23, the shoulder 23 being grooved throughout its entire length. A valve-controlled outlet 28 is provided on the outer surface of the wall for said grooved shoulder. The upper end of the cylindrically-shaped edge 26 has a seat for the end of the set screw 25, consequently the plates are mounted to swing in the wall in the stationary housing section 10. The swinging is normally prevented by a spacer bar 28 extending along the top of the plates. The interior of the tubular edge 26 communicates with the surface of the plate by slots or channels 29, the number of which may vary according to the matter to be filtered. The corrugated surface of the plates is covered with a fabric 30 through which the filtrate has to travel to pass into the channels 29. The corrugated surface may be formed of a plurality of pyramidal projections formed on the surface of the plates. The plate next to the cylindrical edge has a groove 31 into which the ends of the fabric are drawn through the medium of a flexible member 32 for which the plate has apertures at suitable intervals in the groove 31.

The medium to be filtered is fed to the housing through conduits 33 located adjacent each end of the housing in the stationary wall 11. The pressure created within the housing has a tendency to force the lip 15 of the gasket 14 against the flange 16 of the movable housing section 17, thereby increasing pressure on the lip and limiting the possibility of leakage therethrough. The substance passing through the cloth enters the channels 29, from where it passes to the valve-controlled outlet through the hollow cylindrical edge of the plates. The stationary wall 11 also has a valve-controlled conduit 34 leading to a vacuum pump to permit reduction of pressure in the housing when necessary.

It will be noted that the bottom portion 35 of the movable housing section 17 slopes downward toward the stationary housing section 11. This slope provides the necessary clearance required when the housing section 17 is moved on its suspension to expose the plates. This slope also facilitates the accumulation of the substance to be drained at the lowest point of the housing, which is at the lower longitudinal portion 12 of the stationary housing section, whereat a valve-controlled drain 36 is provided. When the movable housing section 17 is moved to expose the plates 24 the cakes formed between the plates will be supported by the plates only and, therefore, under their own weight will drop from between the plates. In cases where there is considerable adherence between the cakes and the plates it is only necessary to remove the spacer bar 28 and swing the first plate, thereby absolutely eliminating any support from the sides for the cake, thus causing the cakes to drop under their own weight, as the single support formed by the plates will under no circumstances be sufficient to support a cake on its sides. The plates being supported only by the wall section, two faces and three edges of the plates will be entirely exposed, thus affording an easy inspection of the plates and facilitating the covering of the faces with cloth, that is to say, the faces of the plates can be covered with the filtering cloth without removing the plates from their support. This increases the efficiency of the press considerably, particularly when acidulated substances are filtrated. With such substances the cloth must be replaced after each filtration.

In Fig. 5 the stationary wall 11' of the housing section 10 presents to each plate 37 a plurality of bores 38 for which the plate has tapering projections 39. These projections are maintained in engagement with the bores by bolts 40 which draw the plate against the stationary wall 11'. The weight of the plates is supported by the longitudinal shoulder 23' provided near the lower longitudinal portion 12' of the stationary housing section 10'. The plates 37 have a sinuous passage 41 therein forming a coil through which brine may be circulated. The upper and lower ends of said passage are in communication with corresponding bores 38 in the wall 11', these bores 38 being provided with suitable conduits 42 through which brine may be circulated. The corrugated surfaces of the plates have channels 43 near the rounded edges 44 in proximity to the stationary wall 11'. Some of these passages lead to the hollow 45 of said rounded edge; the others lead to tapering projection 39. The hollow 45 is in communication with the lowermost tapering projection 39 to discharge the result of filtration passing into the hollow through a suitable conduit 46. The passages 43 in direct communication with the projections 39 lead to a vacuum pump through suitable conduits 47, whereby filtration under a vacuum can be obtained through each individual plate.

By the arrangement as disclosed in Figs. 5 to 7 inclusive, it is possible to utilize the filter press in various industries with substantially no alteration. Furthermore, it increases the field of usefulness of each press considerably, as it permits the utilization of the same for drying purposes in addition to filtration, for in lieu of brine, steam may be circulated, or any other heating medium. When a heating medium is circulated through each plate, the casing which incloses the plates is subjected to a vacuum, thus, evaporation will take place at low temperature and the press is transformed into a drier. The utilization of presses as dryers eliminates the extra handling of the material known as the cake, and the value of the press is greatly enhanced when filtering gelatinous substances, which must be dried, if possible, within the press to obtain proper results.

While I have described the principle of operation, together with the device which I now consider to be the best embodiment thereof, I desire to have it understood that the device shown is merely illustrative and that such changes may be made as are within the scope of the appended claims.

I claim:

1. In a filter press, a casing presenting a wall, filter plates within the casing supported by said wall, said wall and plates presenting tubular joints through which communication may be established with the plates through the wall and means securing the plates to the wall adapted to maintain the joints tight.

2. In a filter press, a housing presenting a substantially vertical wall section and a cover section movable relative to the wall section and complementing the same to form the housing projections on the wall section, filter plates within the housing extending from the wall section and engaging the projections, and means in the wall section for securing said plates to said wall section.

3. In a filter press, a casing presenting a stationary wall section and a movable section complementing the wall section to form the housing, means for locking the two sections together, a shoulder on the wall section, filter plates within the housing extending from the wall section and supported by the shoulder, means forming joints between said plates and wall section through which communication may be established with the plates through the wall section, and means locking the plates to the wall section, and adapted to maintain tight joints between the plates and the wall section.

JOHN JAY NAUGLE.